United States Patent
Fung et al.

(10) Patent No.: US 8,402,297 B2
(45) Date of Patent: Mar. 19, 2013

(54) METHOD AND APPARATUS FOR INDICATING MULTI-POWER RAIL STATUS OF INTEGRATED CIRCUITS

(75) Inventors: Richard W. Fung, Thornhill (CA); Ricky Lau, Toronto (CA); Ju Tung Ng, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 295 days.

(21) Appl. No.: 12/844,322

(22) Filed: Jul. 27, 2010

(65) Prior Publication Data
US 2012/0030488 A1 Feb. 2, 2012

(51) Int. Cl.
*G06F 1/28* (2006.01)

(52) U.S. Cl. ............... 713/340; 713/330; 326/93

(58) Field of Classification Search ......... 713/330, 713/340; 323/265, 901; 326/93
See application file for complete search history.

(56) References Cited

U.S. PATENT DOCUMENTS

| 7,266,707 B2 * | 9/2007 | Ngo et al. ............ 713/300 |
| 7,586,299 B2 * | 9/2009 | Fujiyama et al. ...... 323/350 |
| 7,630,841 B2 * | 12/2009 | Comisky et al. ........ 702/60 |
| 2006/0212266 A1 * | 9/2006 | Chen ................ 702/182 |
| 2009/0158071 A1 * | 6/2009 | Ooi et al. ............ 713/340 |
| 2010/0250973 A1 * | 9/2010 | Breen et al. .......... 713/300 |

* cited by examiner

Primary Examiner — Glenn A Auve
(74) Attorney, Agent, or Firm — Faegre Baker Daniels LLP

(57) ABSTRACT

Methods and apparatus provide for indicating multi-power rail status of integrated circuits by taking into account a clock signal provided by, for example, core logic, in addition to considering voltage levels of multiple power rails. In one example, the apparatus includes multi-power rail status indicating logic that provides a multi-power rail status signal. The multi-power rail status signal is synchronized for assertion with a clock signal of the integrated circuit, such as the core logic of the integrated circuit, in response to an assertion of an asynchronous multi-power rail voltage stability signal. The asynchronous multi-power rail voltage stability signal indicates a state of a plurality of voltage signals from a plurality of power rails supplied to the integrated circuit. The multi-power rail status indicating logic may include a synchronous assertion/asynchronous de-assertion multi-power rail status signal generator that receives the clock signal and the asynchronous multi-power rail voltage stability signal, and in response to of the assertion of the asynchronous multi-power rail voltage stability signal, synchronizes the asynchronous multi-power rail voltage stability signal with the clock signal to assert the multi-power rail status signal.

22 Claims, 5 Drawing Sheets

US 8,402,297 B2

METHOD AND APPARATUS FOR INDICATING MULTI-POWER RAIL STATUS OF INTEGRATED CIRCUITS

BACKGROUND OF THE DISCLOSURE

The disclosure relates generally to methods and apparatus for indicating status of integrated circuits, and more particularly, to methods and apparatus for indicating multi-power rail status of integrated circuits.

In an integrated circuit having multiple power rails and an input/output (I/O) transmitter, it is necessary to control the state of the I/O transmitter during the power-up and power-down conditions. This can be accomplished by using a status signal, also known as a "powergood" signal. When the status signal is logic high, it indicates that all power rails of the integrated circuit are fully powered up and the I/O transmitter can be controlled by core logic of the integrated circuit. When the status signal is logic low, one or more power rails in the integrated circuit are not fully powered up and the I/O transmitter can be put into a known state, such as a tri-state, a pull-up state or a pull-down state.

Particularly, the timing of the status signal is critical to the correct operation of the I/O transmitter. During power-up, if the status signal is asserted before the core logic of the integrated circuit becomes stable (i.e., all control signals from the core logic are valid), the I/O transmitter outputs an unpredictable state. On the other hand, during power-down, it is desirable for the status signal to be de-asserted immediately after the core logic becomes unstable (i.e., the control signals from the core logic are invalid).

One way to provide the status signal and regulate the timing of the status signal is to use an external off-chip power management module coupled to the integrated circuit to set a power sequence of all power rails during power-up and power-down, and to provide an external status signal (e.g., a powergood signal) to the I/O transmitter after all the power signals have ramped up. For example, for an integrated circuit having a first core logic power supply (VDDC), a second core logic power supply (VDDCI), and an I/O power supply (VDDR), the external off-chip power management module, during power-up, sets the core logic power supplies VDDC, VDDCI to be powered-up prior to the I/O power supply VDDR. While during power-down, the external off-chip power management module sets the I/O power supply VDDR to be powered-down prior to the core logic power supplies VDDC, VDDCI.

The external off-chip power management module, however, adds complexity to the integrated circuit design as each one of the power rails has to be controlled to follow the power sequence set by the external off-chip power management module. Moreover, as the external off-chip power management module provides the status signal only based on the state of the power rails, it does not consider the possibility that, during power-up, the core logic may not become stable even though all the power rails are powered-up. In this case, the external off-chip power management module still asserts the status signal to the I/O transmitter, and thus, causes the I/O transmitter to receive invalid data signals from the core logic before the core logic becomes stable.

Accordingly, there exists a need for improved methods and apparatus for indicating multi-power rail status of integrated circuits.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
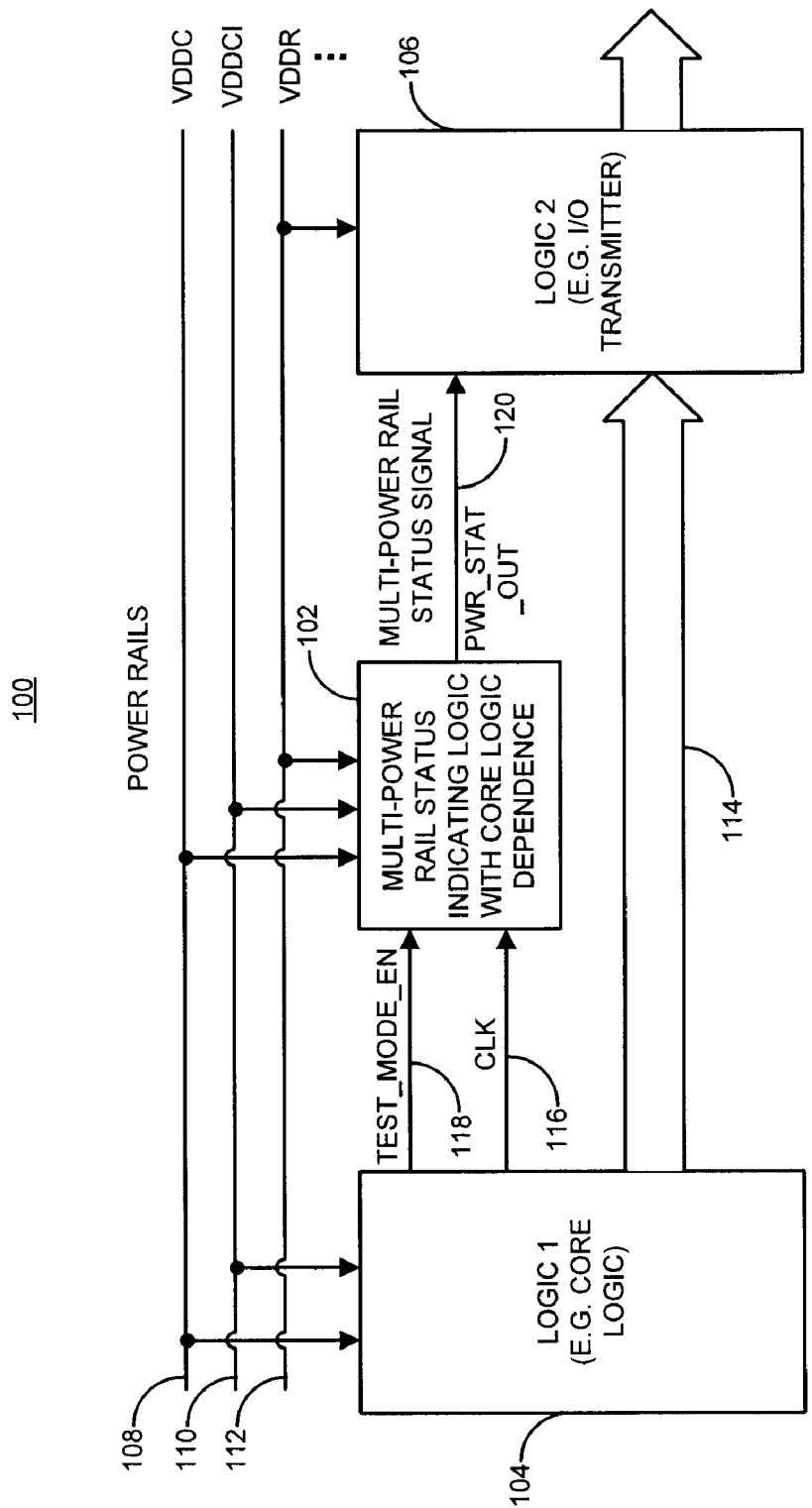
FIG. 1 is a block diagram illustrating one example of an integrated circuit including multi-power rail status indicating logic in accordance with one embodiment set forth in the disclosure.

Briefly, a method and apparatus provide for indicating multi-power rail status of integrated circuits by taking into account a clock signal provided by, for example, core logic, in addition to considering voltage levels of multiple power rails. In one example, the apparatus includes multi-power rail status indicating logic that provides a multi-power rail status signal. The multi-power rail status signal is synchronized for assertion with a clock signal of the integrated circuit, such as the core logic of the integrated circuit, in response to an assertion of an asynchronous multi-power rail voltage stability signal. The asynchronous multi-power rail voltage stability signal indicates a state of a plurality of voltage signals from a plurality of power rails supplied to the integrated circuit. The multi-power rail status indicating logic may include a synchronous assertion/asynchronous de-assertion multi-power rail status signal generator that receives the clock signal and the asynchronous multi-power rail voltage stability signal, and in response to of the assertion of the asynchronous multi-power rail voltage stability signal, synchronizes the asynchronous multi-power rail voltage stability signal with the clock signal to assert the multi-power rail status signal.

The synchronous assertion/asynchronous de-assertion multi-power rail status signal generator may include at least one flip-flop. The at least one flip-flop includes a data input node operative to receive the asynchronous multi-power rail voltage stability signal and a clock node operative to receive the clock signal. The at least one flip-flop also includes an output node operative to output the multi-power rail status signal. The multi-power rail status signal is synchronized for assertion with the clock signal, by the at least one flip-flop, in response to the assertion of the asynchronous multi-power rail voltage stability signal.

The synchronous assertion/asynchronous de-assertion multi-power rail status signal generator may in response to a de-assertion of the asynchronous multi-power rail voltage stability signal, reset the synchronous assertion/asynchronous de-assertion multi-power rail status signal generator to asynchronously de-assert the multi-power rail status signal. The at least one flip-flop in the synchronous assertion/asynchronous de-assertion multi-power rail status signal generator further includes a reset node. The reset node receives the asynchronous multi-power rail voltage stability signal, and in response to the de-assertion of the asynchronous multi-power rail voltage stability signal, resets the synchronous assertion/asynchronous de-assertion multi-power rail status signal generator to asynchronously de-assert the multi-power rail status signal.

In one example, the multi-power rail status indicating logic may include clock gating logic operatively connected to the synchronous assertion/asynchronous de-assertion multi-power rail status signal generator. The clock gating logic generates a gated clock signal based on a pre-gated clock signal of the integrated circuit and a clock enabling signal indicating a state of the integrated circuit. The clock gating logic also provides the gated clock signal as the clock signal to the synchronous assertion/asynchronous de-assertion multi-power rail status signal generator.

In another example, the multi-power rail status indicating logic may include a multi-power rail voltage stability detector operatively connected to the plurality of power rails and the synchronous assertion/asynchronous de-assertion multi-power rail status signal generator. The multi-power rail voltages stability detector receives the plurality of voltage signals from the plurality of power rails. The multi-power rail voltages stability detector also provides the asynchronous multi-power rail voltage stability signal to the synchronous assertion/asynchronous de-assertion multi-power rail status signal generator based on the plurality of voltage signals. The assertion of the asynchronous multi-power rail voltage stability signal indicates all the plurality of voltage signals are asserted, and the de-assertion of the asynchronous multi-power rail voltage stability signal indicates at least one of the plurality of voltage signals is de-asserted.

In still another example, the multi-power rail status indicating logic may further include test mode enabling logic operatively connected to the synchronous assertion/asynchronous de-assertion multi-power rail status signal generator. The test mode enabling logic provides a test mode signal to the synchronous assertion/asynchronous de-assertion multi-power rail status signal generator in response to a test mode enabling signal. In response to an assertion of the test mode signal, the synchronous assertion/asynchronous de-assertion multi-power rail status signal generator asserts the multi-power rail status signal. The at least one flip-flop in the synchronous assertion/asynchronous de-assertion multi-power rail status signal generator further includes a set node. The set node receives the test mode signal, and in response to the assertion of test mode signal, sets the synchronous assertion/asynchronous de-assertion multi-power rail status signal generator to assert the multi-power rail status signal.

In yet another example, the apparatus may include first logic operatively coupled to at least a first voltage signal of the plurality of voltage signals. The first logic is, for example, core logic, and provides the clock signal to the multi-power rail status indicating logic. The apparatus may include second logic operatively coupled to at least a second voltage signal of the plurality of voltage signals. The second logic is, for example, an I/O transmitter, and receives the multi-power rail status signal from the multi-power rail status indicating logic.

Among other advantages, the method and apparatus for indicating multi-power rail status of integrated circuits provide the ability to provide a multi-power rail status signal based on not only the status of the power rails but also the status of the core logic in the integrated circuit, thereby avoiding the situation that, during power-up, the I/O transmitter receives invalid data signals from the unstable core logic even though all the power supplies are stable. That is, the method and apparatus can ensure that core logic is in a stable state before the multi-power rail status signal is asserted and released to the I/O transmitter, thereby preventing the I/O transmitter outputting an unknown state. Moreover, as the multi-power rail status indicating logic is included in the integrated circuit, the conventional external off-chip power management module and the power sequence required by the power management module can be eliminated, thereby reducing the design complexity and the cost of the integrated circuit. Accordingly, the proposed techniques can help preventing the I/O transmitter to drive unpredictable states and reduce the design complexity and cost compared with the conventional techniques. Other advantages will be recognized by those of ordinary skill in the art.

FIG. 1 illustrates one example of an integrated circuit 100 including multi-power rail status indicating logic 102, first logic 104, and second logic 106. The integrated circuit 100 may be any suitable circuit that has the multi-power rail status indicating logic 102, for example, a graphic processor, a central processing unit (CPU), a system controller, a memory controller or an I/O controller, to name a few. The first logic 104 may include but is not limited to core logic. The second logic 106 may include but is not limited to an I/O transmitter or any suitable I/O circuit known in the art. The "logic" referred to herein is any suitable circuit that can achieve the desired function, and may be a digital circuit, an analog circuit, a mixed analog-digital circuit or any suitable circuit.

The integrated circuit 100 includes multiple power rails 108-112 (e.g., VDDC 108, VDDCI 110, VDDR 112) as power supplies. In this example, VDDC 108 and VDDCI 110 are operatively coupled to the first logic 104 (e.g., core logic) and provide voltage signals to the first logic 104. For example, the voltage level of VDDC 108 is from about 1.1 V to about 1.7 V, and the voltage level of VDDCI 110 is about 1.2 V. VDDR 112 is operatively coupled to the second logic 106 (e.g., I/O transmitter) and provides a voltage signal to the second logic 106. The voltage level of VDDR 112 is, for example, about 1.5 V. All the power rails 108-112 are operatively coupled to the multi-power rail status indicating logic 102 and provide voltage signals to the multi-power rail status indicating logic 102. It is understood that additional power rails may be included in the integrated circuit 100 and operatively coupled to the multi-power rail status indicating logic 102.

In this example, the core logic 104 transmits data and control signals to the I/O transmitter 106 via a bus 114. The core logic 104 also sends signals to the multi-power rail status indicating logic 102, such as but not limited to a clock signal (CLK) 116 and a test mode enabling signal (TEST_MODE_EN) 118. In operation, in response to the voltage signals from the power rails 108-112 and the clock signal 116 from the core logic 104, the multi-power rail status indicating logic 102 sends signals such as a multi-power rail status signal (PWR_STAT_OUT) 120 to the I/O transmitter 106 to indicate a state of both the multiple power rails 108-112 and the core logic 104. For example, the assertion of the multi-power rail status signal 120 indicates that the core logic 104 as well as the voltage levels of multiple power rails 108-112 are stable.

Figure 2:
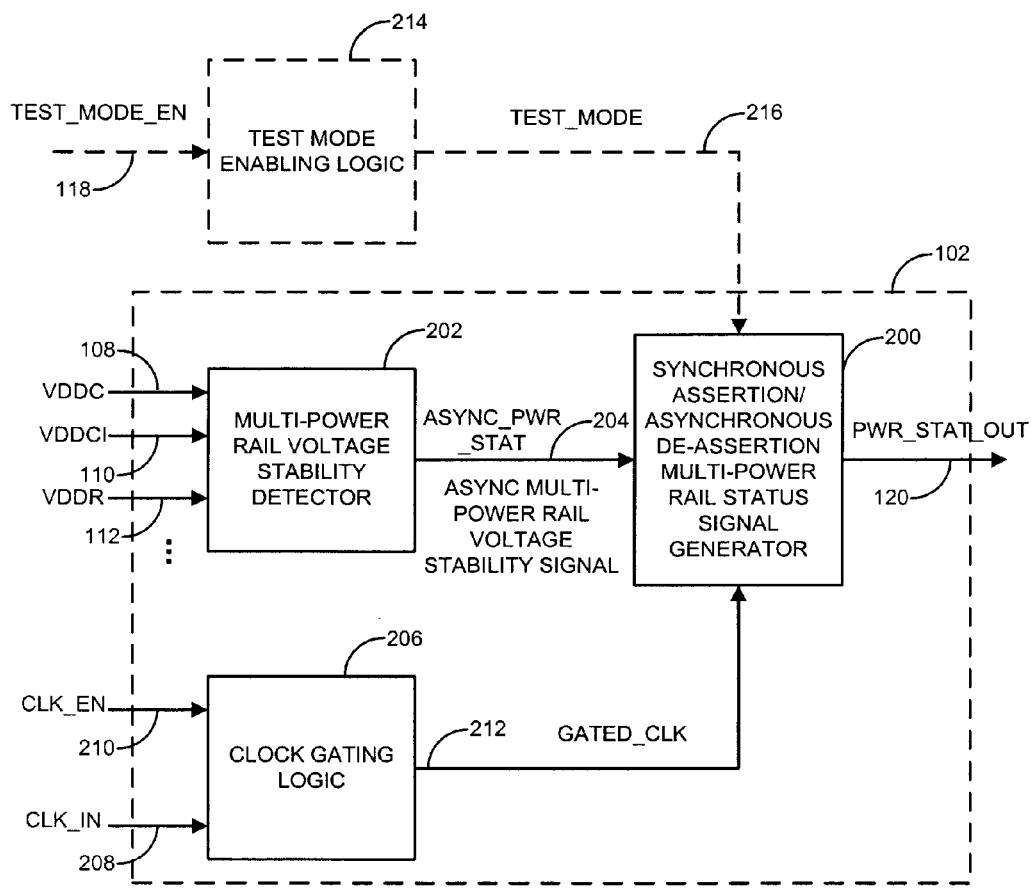
FIG. 2 is a block diagram illustrating one example of the multi-power rail status indicating logic shown in FIG. 1.

FIG. 2 illustrates one example of multi-power rail status indicating logic 102 in an integrated circuit 100. The multi-power rail status indicating logic 102 includes a synchronous assertion/asynchronous de-assertion multi-power rail status signal generator 200 that generates the multi-power rail status signal 120. The multi-power rail status indicating logic 102 may include a multi-power rail voltage stability detector 202 operatively connected to the synchronous assertion/asynchronous de-assertion multi-power rail status signal generator 200 and the power rails 108-112. The multi-power rail voltage stability detector 202 detects whether all the voltage signals of multiple power rails 108-112 are valid, and provides the detection result to the synchronous assertion/asynchronous de-assertion multi-power rail status signal generator 200.

In operation, the multi-power rail voltage stability detector 202 receives the voltage signals from the power rails 108-112 and provides an asynchronous multi-power rail voltage stability signal (ASYNC_PWR_STAT) 204 to the synchronous assertion/asynchronous de-assertion multi-power rail status signal generator 200 based on the voltage signals 108-112. Also referring to the timing diagram of FIG. 4, when all the voltage signals 108-112 are logic high or above a threshold voltage (also referred as "assertion" herein), the asynchronous multi-power rail voltage stability signal 204 is logic high; and when one or more voltage signals 108-112 are logic low or below a threshold voltage (also referred as "de-assertion" herein), the asynchronous multi-power rail voltage stability signal 204 is logic low. In other words, the assertion of the asynchronous multi-power rail voltage stability signal 204 indicates all voltage signals 108-112 are asserted and that the multiple power rails 108-112 are in a stable state, while the de-assertion of the asynchronous multi-power rail voltage stability signal 204 indicates at least one of the voltage signals 108-112 is de-asserted and that the multiple power rails 108-112 are in an unstable state. The multi-power rail voltage stability detector 202 may be any suitable circuit, logic or programmed processor known in the art that can achieve the function described above. For example, the multi-power rail voltage stability detector 202 may be a three-input AND gate. Each one of the three inputs of the AND gate is connected to VDDC 108, VDDCI 110, and VDDR 112, respectively, and the output of the AND gate is the asynchronous multi-power rail voltage stability signal 204. It is understood that the multi-power rail voltage stability detector 202 may not be included in the multi-power rail status indicating logic 102. Instead, the synchronous assertion/asynchronous de-assertion multi-power rail status signal generator 200 may receive the asynchronous multi-power rail voltage stability signal 204 from the core logic 104 of the integrated circuit 100 or from an external module. Nevertheless, the synchronous assertion/asynchronous de-assertion multi-power rail status signal generator 200 receives the asynchronous multi-power rail voltage stability signal 204 that indicates the state of the multiple power rails 108-112 of the integrated circuit 100.

The multi-power rail status indicating logic 102 may also include clock gating logic 206 operatively connected to the synchronous assertion/asynchronous de-assertion multi-power rail status signal generator 200.

In operation, the clock gating logic 206 receives, from the core logic 104, a pre-gated clock signal (CLK_IN) 208 of the integrated circuit 100 and a clock enabling signal (CLK_EN) 210. The clock enabling signal 210 may be any suitable signal that indicates a state of the core logic 104 and/or the integrated circuit 100, such as but not limited to an invert global reset signal of the integrated circuit 100. Also referring to the timing diagram of FIG. 4, during power-up 400, the clock enabling signal 210 remains logic low until the core logic 104 is in a stable state. The pre-gated clock signal 208 is, for example, an internal clock signal of the core logic 104 or a system/global clock signal of the integrated circuit 100. In operation, the pre-gated clock signal 208 is gated by the clock enabling signal 210 using the clock gating logic 206, and then becomes a gated clock signal (GATED_CLK) 212, as shown in the timing diagram of FIG. 4. In this example, the gated clock signal 212 is sent to the synchronous assertion/asynchronous de-assertion multi-power rail status signal generator 200 as the clock signal 116. It is understood that the clock gating logic 206 may not be included in the multi-power rail status indicating logic 102. Instead, the synchronous assertion/asynchronous de-assertion multi-power rail status signal generator 200 receives the pre-gated clock signal 208 directly from the core logic 104 as the clock signal 116.

In operation, the synchronous assertion/asynchronous de-assertion multi-power rail status signal generator 200 provides the multi-power rail status signal 120 based on both the asynchronous multi-power rail voltage stability signal 204 and the gated clock signal 212. As the asynchronous multi-power rail voltage stability signal 204 indicates a state of the multiple power rails 108-112, and the gated clock signal 212 indicates a state of the core logic 104, the multi-power rail status signal 120 indicates a state of both the multiple power rails 108-112 and the core logic 104 of the integrated circuit 100.

Optionally, the multi-power rail status indicating logic 102 may further include testing mode enabling logic 214 operatively connected to the synchronous assertion/asynchronous de-assertion multi-power rail status signal generator 200. In operation, the testing mode enabling logic 214 receives the test mode enabling signal 118 from the core logic 104, and sends a test mode signal 216 to the synchronous assertion/asynchronous de-assertion multi-power rail status signal generator 200. The test mode enabling signal 118 indicates whether the integrated circuit 100 operates in a test mode. For example, an assertion of the test mode enabling signal 118 indicates that the integrated circuit 100 operates in the test mode, while the de-assertion of the test mode enabling signal 118 indicates a normal mode. As shown in the timing diagram of FIG. 4, the test mode enabling signal 118 remains logic low during power-up 400 and power-down 402 in normal operation.

Figure 3:
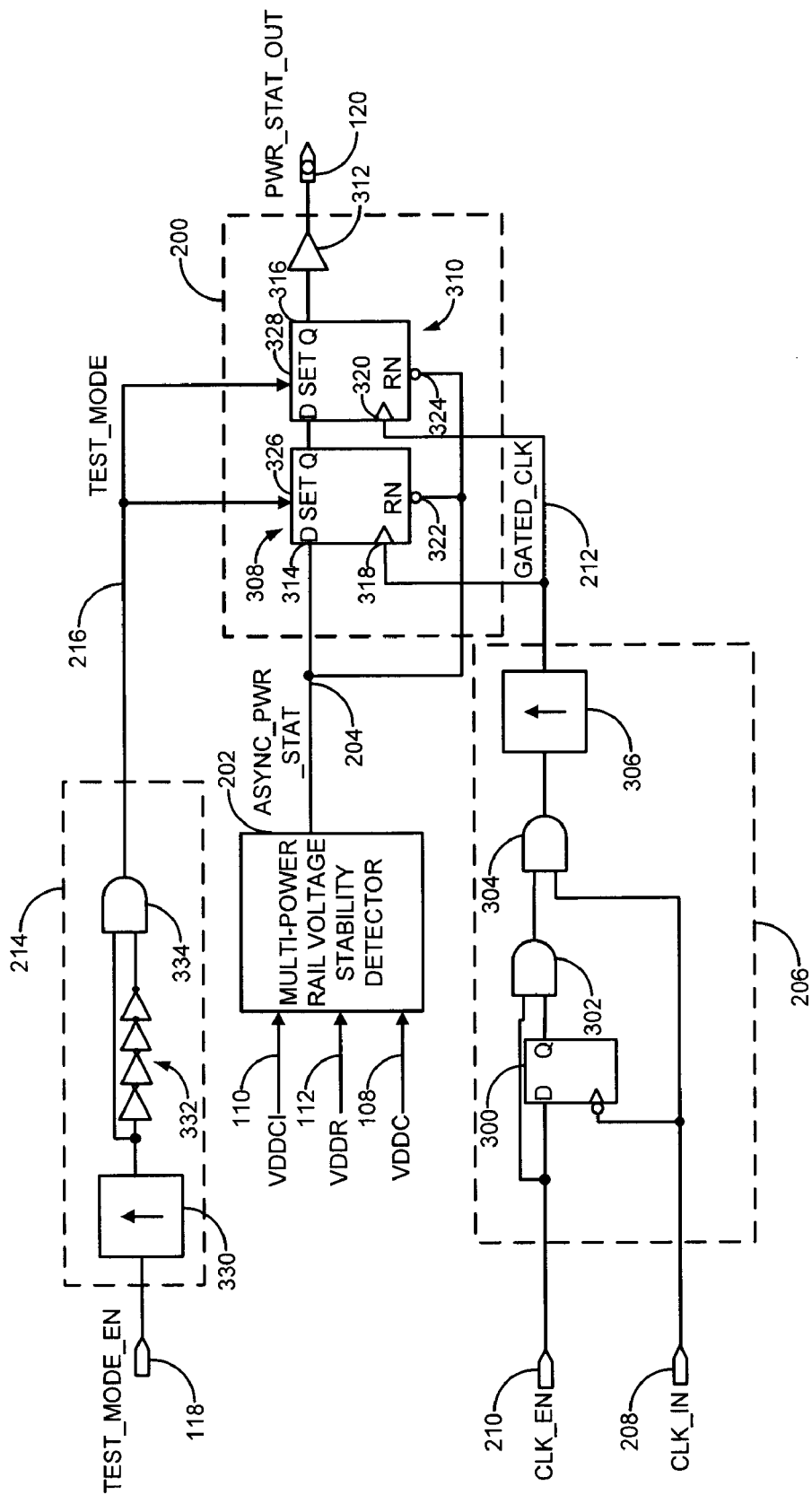
FIG. 3 is a detailed diagram illustrating one example of the multi-power rail status indicating logic shown in FIG. 2.

FIG. 3 is a detailed diagram illustrating one example of the multi-power rail status indicating logic 102 shown in FIG. 2. The clock gating logic 206, in this example, includes a D type flip-flop (DFF) 300, two AND gates 302, 304, and a voltage level shifter 306. The DFF 300 and two AND gates 302, 304 form a clock gating circuit that gates the pre-gated clock signal 208 by the clock enabling signal 210. The clock gating logic 206 operates in the VDDCI 110 voltage domain. In operation, also referring to FIG. 4, two clock cycles after the clock enabling signal 210 being asserted, a gated clock signal 212 is released and follows the pre-gated clock signal 208. As such, the clock gating logic 206 assures that the gated clock signal 212 is released only after the core logic 104 is in a stable state. Additionally, the clock gating logic 206 reduces the power consumption of the multi-power rail status indicating logic 102 after power-up 400. In this example, as the clock gating logic 206 operates in the VDDCI 110 domain while the synchronous assertion/asynchronous de-assertion multi-power rail status signal generator 200 operates in the VDDR 112 domain, the voltage level shifter 306 is also included in the clock gating logic 206 to shift the voltage level of the gated clock signal 212 to the VDDR 112 voltage domain. Any suitable voltage level shifter known in the art may be employed.

As shown in FIG. 3, the synchronous assertion/asynchronous de-assertion multi-power rail status signal generator 200, in this example, includes a first DFF with set and reset (DFF-SR) 308, a second DFF-SR 310, and a buffer 312. The synchronous assertion/asynchronous de-assertion multi-power rail status signal generator 200 operates in the VDDR 112 voltage domain. Each DFF-SR 308, 310 includes a data input node, a clock node, an output node, a set node, and a reset node. In this example, the output node of the first DFF-SR 308 is connected to the data input node of the second DFF-SR 310 to cascade the two DFF-SR 308, 310. The data input node 314 of the first DFF-SR 308 is operatively connected to the multi-power rail voltage stability detector 202 and receives the asynchronous multi-power rail voltage stability signal 204 as the input data of the DFF-SR 308, 310. The clock nodes 318, 320 of the two DFF-SR 308, 310 are operatively connected to the clock gating logic 206 and receive the gated clock signal 212 as the clock signal of the DFF-SR 308, 310. The two reset nodes 322, 324 of the two DFF-SR 308, 310 are also operatively connected to the multi-power rail voltage stability detector 202 and receive the asynchronous multi-power rail voltage stability signal 204 as the reset signal of the DFF-SR 308, 310. The output node 316 of the second DFF-SR 310 outputs the multi-power rail status signal 120 to the I/O transmitter 106.

Figure 4:
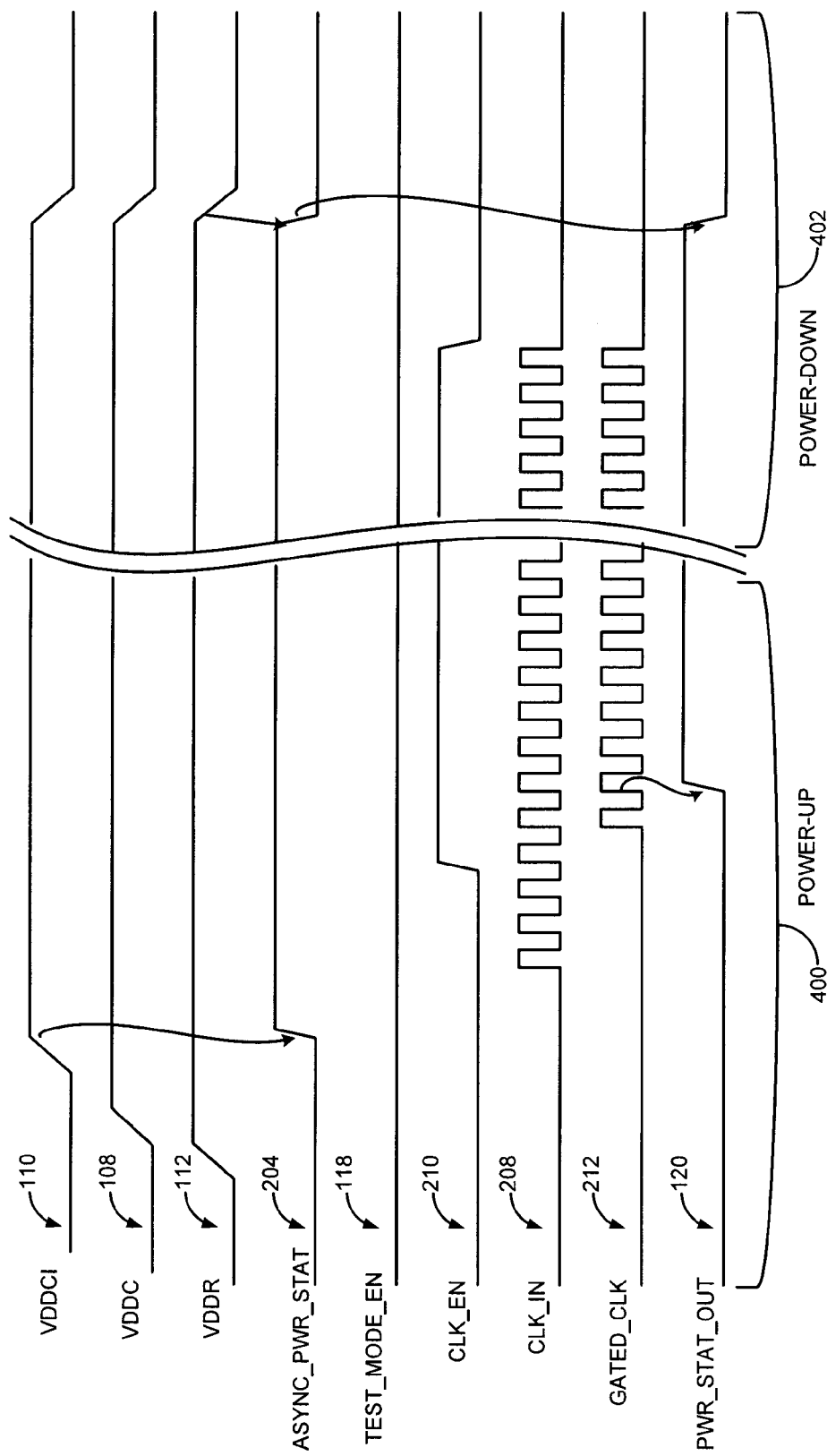
FIG. 4 is a timing diagram illustrating one example of signals of the multi-power rail status indicating logic shown in FIGS. 2 and 3.

In operation, as shown in the timing diagram of FIG. 4, during power-up 400, the asynchronous multi-power rail voltage stability signal 204 is asserted when all the voltage signals of the power rails 108-112 are asserted prior to the assertion of the clock enabling signal 210. In this case, although the assertion of the asynchronous multi-power rail voltage stability signal 204 indicates the stability of the power rails 108-112, as the clock enabling signal 210 is still de-asserted, which indicates that the core logic 104 of the integrated circuit 100 is not in a stable state, the gated clock signal 212 remains de-asserted and causes the multi-power rail status signal 120 to remain de-asserted. As previously noted, when the core logic 104 is in a stable state, the clock enabling signal 210 is asserted, and releases the pre-gated clock signal 208. Accordingly, the gated clock signal 212 starts to synchronize (i.e., edge-aligned) the asynchronous multi-power rail voltage stability signal 204 and assert the multi-power rail status signal 120 by the two DFF-SR 308, 310. In particular, as the asynchronous multi-power rail voltage stability signal 204 is asserted during power-up 400, the synchronization by the synchronous assertion/asynchronous de-assertion multi-power rail status signal generator 200 causes the assertion of the multi-power rail status signal 120. That is, the assertion of the multi-power rail status signal 120 is synchronized with the pre-gated clock signal 208 and gated by the clock enabling signal 210. The multi-power rail status signal 120 is sent to the I/O transmitter 106 in the integrated circuit 100, and the assertion of the multi-power rail status signal 120 indicates that the I/O transmitter 106 can start to receive data from the core logic 104 as both the power rails 108-112 and the core logic 104 are in a stable state.

During power-down 402, if any one of the voltage signals from the power rails 108-112 is de-asserted, the asynchronous multi-power rail voltage stability signal 204 is de-asserted. As the reset nodes 322, 324 of the two DFF-SR 308, 310 receive the asynchronous multi-power rail voltage stability signal 204, the de-assertion immediately resets the two DFF-SR 308, 310 and causes the de-assertion of the multi-power rail status signal 120. That is, the de-assertion of the multi-power rail status signal 120 is asynchronous and follows the de-assertion of the asynchronous multi-power rail voltage stability signal 204 immediately. This ensures that the I/O transmitter 106 is disabled immediately if one of the power supplies is removed.

As shown in FIG. 3, in this example, the set nodes 326, 328 of the DFF-SR 308, 310 are operatively connected to the test mode enabling logic 214 and receive the test mode signal 216. The test mode enabling logic 214 includes a voltage level shifter 330, a buffer 332, and an AND gate 334. The test mode enabling logic 214 receives the test mode enabling signal 118 from the core logic 104. The assertion of the test mode enabling signal 118 may indicate that the integrated circuit 100 operates in a test mode. As the test mode enabling signal 118 is in the VDDCI 110 domain while the test mode signal 216 is in the VDDR 112 domain, the voltage level shifter 330 may be included to perform the voltage level shifting. Any suitable voltage level shifter known in the art may be employed. The buffer 332 and AND gate 334 may be included in the test mode enabling logic 214 to form a deglitching circuit to filter out glitches on the received test mode enabling signal 118. In this example, the buffer 332 includes four invertors and has a delay time of about 200 picosec.

In operation, during the normal mode, as shown in FIG. 4, the test mode signal 216 remains de-asserted and does not affect the multi-power rail status signal 120. On the other hand, during the test mode, the test mode signal 216 is asserted, and thus, causes setting of the two DFF-SR 308, 310. Accordingly, even though the clock signal 116 from the core logic 104 may be de-asserted during the test mode, the multi-power rail status signal 120 is still forced to be asserted, such that the I/O transmitter 106 is enabled and can perform the test properly.

Figure 5:
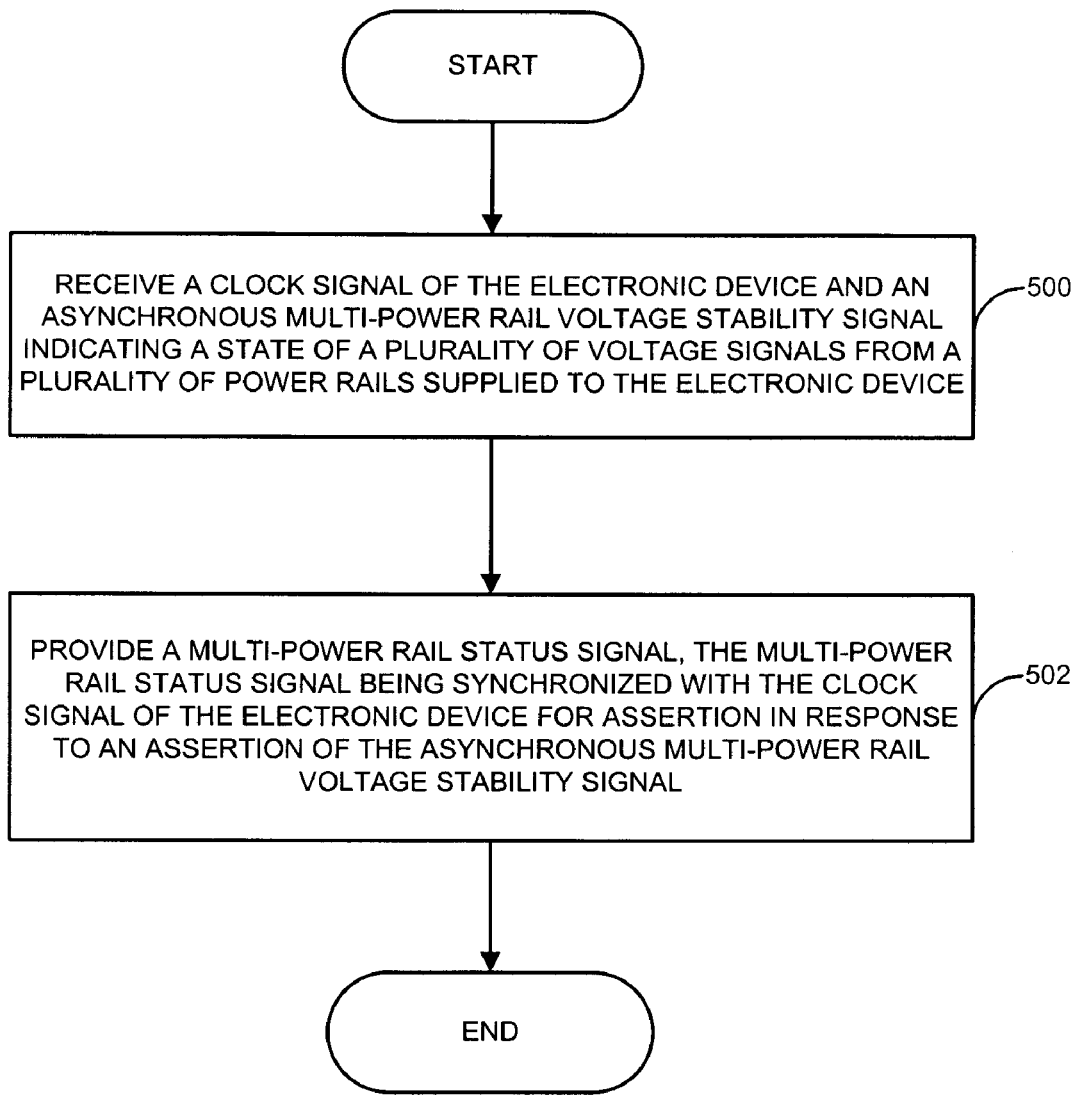
FIG. 5 is a flowchart illustrating one example of a method for indicating multi-power rail status of integrated circuits in accordance with one embodiment set forth in the disclosure.

FIG. 5 illustrates an example of a method for indicating multi-power rail status of integrated circuits. It will be described with reference to the above figures. However, any suitable logic or structure may be employed. At block 500, the method includes receiving a clock signal 116 of an integrated circuit 100 and an asynchronous multi-power rail voltage stability signal 204 indicating a state of voltage signals from multiple power rails 108-112 supplied to the integrated circuit 100. At block 502, the method also includes providing a multi-power rail status signal 120 that is synchronized for assertion with the clock signal 116 of the integrated circuit 100 in response to an assertion of the asynchronous multi-power rail voltage stability signal 204. In one example, the received clock signal 116 is a gated clock signal 212 generated based on a clock enabling signal 210 indicating a state of the integrated circuit 100 and a pre-gated clock signal 208 of the integrated circuit 100.

Also, integrated circuit design systems (e.g., work stations) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and circuits described herein may also be produced as integrated circuits by such systems using the computer readable medium with instructions stored therein. For example, an integrated circuit with the aforedescribed logic and circuits may be created using such integrated circuit fabrication systems. The computer readable medium stores instructions executable by one or more integrated circuit design systems that causes the one or more integrated circuit design systems to design an integrated circuit. The designed integrated circuit includes multi-power rail status indicating logic as well as other structure as disclosed herein. The multi-power rail status indicating logic provides a multi-power rail status signal that is synchronized for assertion with a clock signal of the designed integrated circuit in response to an assertion of an asynchronous multi-power rail voltage stability signal indicating a state of a plurality of voltage signals from a plurality of power rails supplied to the designed integrated circuit.

Among other advantages, the method and apparatus for indicating multi-power rail status of integrated circuits provide the ability to provide a multi-power rail status signal based on not only the status of the power rails but also the status of the core logic in the integrated circuit, thereby avoiding the situation that, during power-up, the I/O transmitter receives invalid data signals from the unstable core logic even though all the power supplies are stable. That is, the method and apparatus can ensure that core logic is in a stable state before the multi-power rail status signal is asserted and released to the I/O transmitter, thereby preventing the I/O transmitter outputting an unknown state. Moreover, as the multi-power rail status indicating logic is included in the integrated circuit, the conventional external off-chip power management module and the power sequence required by the power management module can be eliminated, thereby reducing the design complexity and the cost of the integrated circuit. Accordingly, the proposed techniques can help preventing the I/O transmitter to drive unpredictable states and reduce the design complexity and cost compared with the conventional techniques. Other advantages will be recognized by those of ordinary skill in the art.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. An integrated circuit comprising multi-power rail status indicating logic operative to provide a multi-power rail status signal, the multi-power rail status signal being synchronized for assertion with a clock signal of the integrated circuit in response to an assertion of an asynchronous multi-power rail voltage stability signal indicating a state of a plurality of voltage signals from a plurality of power rails supplied to the integrated circuit.

2. The integrated circuit of claim 1, wherein the multi-power rail status indicating logic comprises a synchronous assertion/asynchronous de-assertion multi-power rail status signal generator operative to:
   receive the clock signal and the asynchronous multi-power rail voltage stability signal; and
   in response to the assertion of the asynchronous multi-power rail voltage stability signal, synchronize the asynchronous multi-power rail voltage stability signal with the clock signal to assert the multi-power rail status signal.

3. The integrated circuit of claim 2, wherein the synchronous assertion/asynchronous de-assertion multi-power rail status signal generator comprises at least one flip-flop, the at least one flip-flop comprising:
   a data input node operative to receive the asynchronous multi-power rail voltage stability signal;
   a clock node operative to receive the clock signal; and
   an output node operative to output the multi-power rail status signal, the multi-power rail status signal being synchronized for assertion with the clock signal, by the at least one flip-flop, in response to the assertion of the asynchronous multi-power rail voltage stability signal.

4. The integrated circuit of claim 3, wherein the synchronous assertion/asynchronous de-assertion multi-power rail status signal generator is further operative to, in response to a de-assertion of the asynchronous multi-power rail voltage stability signal, reset the synchronous assertion/asynchronous de-assertion multi-power rail status signal generator to asynchronously de-assert the multi-power rail status signal.

5. The integrated circuit of claim 4, wherein the at least one flip-flop in the synchronous assertion/asynchronous de-assertion multi-power rail status signal generator further comprises a reset node operative to:
   receive the asynchronous multi-power rail voltage stability signal; and
   in response to the de-assertion of the asynchronous multi-power rail voltage stability signal, reset the synchronous assertion/asynchronous de-assertion multi-power rail status signal generator to asynchronously de-assert the multi-power rail status signal.

6. The integrated circuit of claim 3, wherein the multi-power rail status indicating logic further comprises test mode enabling logic, operatively connected to the synchronous assertion/asynchronous de-assertion multi-power rail status signal generator, operative to provide a test mode signal to the synchronous assertion/asynchronous de-assertion multi-power rail status signal generator in response to a test mode enabling signal,
   wherein the synchronous assertion/asynchronous de-assertion multi-power rail status signal generator is further operative to, in response to an assertion of the test mode signal, assert the multi-power rail status signal.

7. The integrated circuit of claim 6, wherein the at least one flip-flop in the synchronous assertion/asynchronous de-assertion multi-power rail status signal generator further comprises a set node operative to:
   receive the test mode signal; and
   in response to the assertion of the test mode signal, set the synchronous assertion/asynchronous de-assertion multi-power rail status signal generator to assert the multi-power rail status signal.

8. The integrated circuit of claim 2, wherein the multi-power rail status indicating logic further comprises clock gating logic, operatively connected to the synchronous assertion/asynchronous de-assertion multi-power rail status signal generator, operative to:
   generate a gated clock signal based on a pre-gated clock signal of the integrated circuit and a clock enabling signal indicating a state of the integrated circuit; and
   provide the gated clock signal as the clock signal to the synchronous assertion/asynchronous de-assertion multi-power rail status signal generator.

9. The integrated circuit of claim 2, wherein the multi-power rail status indicating logic further comprises a multi-power rail voltage stability detector, operatively connected to the plurality of power rails and the synchronous assertion/asynchronous de-assertion multi-power rail status signal generator, operative to:
   receive the plurality of voltage signals from the plurality of power rails; and
   provide the asynchronous multi-power rail voltage stability signal to the synchronous assertion/asynchronous de-assertion multi-power rail status signal generator based on the plurality of voltage signals, wherein the assertion of the asynchronous multi-power rail voltage stability signal indicates all the plurality of voltage signals are asserted, and a de-assertion of the asynchronous multi-power rail voltage stability signal indicates at least one of the plurality of voltage signals is de-asserted.

10. The integrated circuit of claim 1 further comprising:
   first logic, operatively coupled to at least a first voltage signal of the plurality of voltage signals, operative to provide the clock signal to the multi-power rail status indicating logic; and
   second logic, operatively coupled to at least a second voltage signal of the plurality of voltage signals, operative to receive the multi-power rail status signal from the multi-power rail status indicating logic.

11. The integrated circuit of claim 10 wherein the first logic is core logic and wherein the second logic comprises a transmitter wherein the transmitter is coupled to a differing power rail than the core logic.

12. Multi-power rail status indicating logic comprising a synchronous assertion/asynchronous de-assertion multi-power rail status signal generator operative to:
- receive a clock signal of core logic and an asynchronous multi-power rail voltage stability signal indicating a state of a plurality of voltage signals from a plurality of power rails; and
- in response to an assertion of the asynchronous multi-power rail voltage stability signal, synchronize the asynchronous multi-power rail voltage stability signal with the clock signal of the core logic to assert a multi-power rail status signal.

13. The multi-power rail status indicating logic of claim 12, wherein the synchronous assertion/asynchronous de-assertion multi-power rail status signal generator comprises at least one flip-flop, the at least one flip-flop comprising:
- a data input node operative to receive the asynchronous multi-power rail voltage stability signal;
- a clock node operative to receive the clock signal; and
- an output node operative to output the multi-power rail status signal, the multi-power rail status signal being synchronized for assertion with the clock signal, by the at least one flip-flop, in response to the assertion of the asynchronous multi-power rail voltage stability signal.

14. The multi-power rail status indicating logic of claim 13, wherein the synchronous assertion/asynchronous de-assertion multi-power rail status signal generator is further operative to, in response to a de-assertion of the asynchronous multi-power rail voltage stability signal, reset the synchronous assertion/asynchronous de-assertion multi-power rail status signal generator to asynchronously de-assert the multi-power rail status signal.

15. The multi-power rail status indicating logic of claim 14, wherein the at least one flip-flop in the synchronous assertion/asynchronous de-assertion multi-power rail status signal generator further comprises a reset node operative to:
- receive to the asynchronous multi-power rail voltage stability signal; and
- in response to the de-assertion of the asynchronous multi-power rail voltage stability signal, reset the synchronous assertion/asynchronous de-assertion multi-power rail status signal generator to asynchronously de-assert the multi-power rail status signal.

16. The multi-power rail status indicating logic of claim 13 further comprising test mode enabling logic, operatively connected to the synchronous assertion/asynchronous de-assertion multi-power rail status signal generator, operative to provide a test mode signal to the synchronous assertion/asynchronous de-assertion multi-power rail status signal generator in response to a test mode enabling signal,
- wherein the synchronous assertion/asynchronous de-assertion multi-power rail status signal generator is further operative to, in response to an assertion of the test mode signal, assert the multi-power rail status signal.

17. The multi-power rail status indicating logic of claim 16, wherein the at least one flip-flop in the synchronous assertion/asynchronous de-assertion multi-power rail status signal generator further comprises a set node operative to:
- receive the test mode signal; and
- in response to the assertion of the test mode signal, set the synchronous assertion/asynchronous de-assertion multi-power rail status signal generator to assert the multi-power rail status signal.

18. The multi-power rail status indicating logic of claim 12 further comprising clock gating logic, operatively connected to the synchronous assertion/asynchronous de-assertion multi-power rail status signal generator, operative to:
- generate a gated clock signal based on a pre-gated clock signal of the core logic and a clock enabling signal indicating a state of the core logic; and
- provide the gated clock signal as the clock signal to the synchronous assertion/asynchronous de-assertion multi-power rail status signal generator.

19. The multi-power rail status indicating logic of claim 12 further comprising a multi-power rail voltage stability detector, operatively connected to the plurality of power rails and the synchronous assertion/asynchronous de-assertion multi-power rail status signal generator, operative to:
- receive the plurality of voltage signals from the plurality of power rails; and
- provide the asynchronous multi-power rail voltage stability signal to the synchronous assertion/asynchronous de-assertion multi-power rail status signal generator based on the plurality of voltage signals, wherein the assertion of the asynchronous multi-power rail voltage stability signal indicates all the plurality of voltage signals are asserted, and a de-assertion of the asynchronous multi-power rail voltage stability signal indicates at least one of the plurality of voltage signals is de-asserted.

20. A method carried out by an electronic device comprising:
- receiving a clock signal of the electronic device and an asynchronous multi-power rail voltage stability signal indicating a state of a plurality of voltage signals from a plurality of power rails supplied to the electronic device; and
- providing a multi-power rail status signal, the multi-power rail status signal being synchronized for assertion with the clock signal of the electronic device in response to an assertion of the asynchronous multi-power rail voltage stability signal.

21. The method of claim 20, wherein the received clock signal is a gated clock signal generated based on a clock enabling signal indicating a state of the electronic device and a pre-gated clock signal of the electronic device.

22. A computer readable medium storing instructions executable by one or more integrated circuit design systems that causes the one or more integrated circuit design systems to design an integrated circuit comprising multi-power rail status indicating logic operative to provide a multi-power rail status signal, the multi-power rail status signal being synchronized for assertion with a clock signal of the integrated circuit in response to an assertion of an asynchronous multi-power rail voltage stability signal indicating a state of a plurality of voltage signals from a plurality of power rails supplied to the integrated circuit.

* * * * *